(12) United States Patent
Terashita et al.

(10) Patent No.: US 12,379,197 B2
(45) Date of Patent: Aug. 5, 2025

(54) ABNORMALITY DETERMINATION APPARATUS, ABNORMALITY DETERMINATION METHOD, AND ABNORMALITY DETERMINATION SYSTEM

(71) Applicant: MITUTOYO CORPORATION, Kanagawa (JP)

(72) Inventors: Yo Terashita, Ibaraki (JP); Yuuto Karasawa, Saitama (JP); Akira Takada, Kanagawa (JP); Shinji Hashimoto, Kanagawa (JP); Takuya Komada, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 363 days.

(21) Appl. No.: 17/719,618

(22) Filed: Apr. 13, 2022

(65) Prior Publication Data

US 2022/0349694 A1 Nov. 3, 2022

(30) Foreign Application Priority Data

Apr. 28, 2021 (JP) ................................. 2021-076231

(51) Int. Cl.
 *G01B 5/00* (2006.01)
 *G01B 5/012* (2006.01)
(52) U.S. Cl.
 CPC ........... *G01B 5/0014* (2013.01); *G01B 5/012* (2013.01)

(58) Field of Classification Search
 CPC ...... G01B 5/0014; G01B 5/012; G01B 5/008; G01B 21/042; G06F 16/29; G06F 16/2458; G06F 16/288
 See application file for complete search history.

(56) References Cited

U.S. PATENT DOCUMENTS 10,354,383 B2 * 7/2019 Lapiere ................. G06T 7/0012
2002/0157449 A1 10/2002 Asanuma
(Continued)

FOREIGN PATENT DOCUMENTS

| JP | 2001-21304 | 1/2001 |
| JP | 2001-311618 | 11/2001 |

(Continued)

*Primary Examiner* — Tung S Lau
(74) *Attorney, Agent, or Firm* — Greenblum & Bernstein, P.L.C.

(57) ABSTRACT

An abnormality determination apparatus includes a data acquisition part that acquires position data indicating a plurality of positions to be measured of a standard gage used in a coordinate measuring apparatus, in association with apparatus identification information for identifying the coordinate measuring apparatus, a generation part that generates distance data indicating a distance to be measured that is a distance between the plurality of positions to be measured indicated by the position data, a storage that stores an appropriate range in which the distance data is determined to be appropriate, and a determination part that determines whether there is an abnormality in the coordinate measuring apparatus on the basis of whether or not the distance to be measured indicated by the distance data is included in the appropriate range, and outputs a determination result in association with the apparatus identification information.

12 Claims, 7 Drawing Sheets

(56) References Cited

U.S. PATENT DOCUMENTS

| | | | |
|---|---|---|---|
| 2005/0083537 A1* | 4/2005 | Kuchel | G01B 9/02072 365/513 |
| 2011/0246115 A1* | 10/2011 | Hon | G01B 7/008 702/95 |
| 2015/0000148 A1 | 1/2015 | Abe | |
| 2020/0380802 A1* | 12/2020 | Mori | B60W 40/10 |
| 2021/0058519 A1* | 2/2021 | Shiota | H04N 1/00769 |

FOREIGN PATENT DOCUMENTS

| | | | |
|---|---|---|---|
| JP | 2012-58057 | | 3/2012 |
| JP | 2012-137301 | | 7/2012 |
| JP | 2015-10901 | | 1/2015 |
| JP | 2015-99049 A | | 5/2015 |
| JP | 2019-152095 | * | 9/2020 |
| WO | WO 2014181881 A1 * | 11/2014 | G03B 13/36 |

* cited by examiner

ABNORMALITY DETERMINATION APPARATUS, ABNORMALITY DETERMINATION METHOD, AND ABNORMALITY DETERMINATION SYSTEM

CROSS-REFERENCE TO RELATED APPLICATIONS

The present application claims priority to Japanese Patent Applications number 2021-076231, filed on Apr. 28, 2021. The contents of this applications are incorporated herein by reference in their entirety.

BACKGROUND OF THE INVENTION

A coordinate measuring apparatus is known as a measuring apparatus for measuring a dimension, geometry, and the like of an object to be measured. The coordinate measuring apparatus is calibrated periodically using a standard gage to maintain the accuracy of the measurement (for example, see Japanese Unexamined Patent Application Publication No. 2015-99049).

Immediately after calibration of a coordinate measuring apparatus, the coordinate measuring apparatus can measure an object to be measured with high accuracy. However, there is a problem that the accuracy of the measurement of the coordinate measuring apparatus is degraded if the state of the coordinate measuring apparatus changes before the next calibration.

BRIEF SUMMARY OF THE INVENTION

The present disclosure focuses on this point, and an object of the present disclosure is to determine the occurrence of an abnormality in a coordinate measuring apparatus at an early stage.

An abnormality determination apparatus according to a first aspect of the present disclosure includes a data acquisition part that acquires position data indicating a plurality of positions to be measured of a standard gage used in a coordinate measuring apparatus, in association with apparatus identification information for identifying the coordinate measuring apparatus, a generation part that generates distance data indicating a distance to be measured that is a distance between the plurality of positions to be measured indicated by the position data, a storage that stores an appropriate range in which the distance data is determined to be appropriate, and a determination part that determines whether there is an abnormality in the coordinate measuring apparatus on the basis of whether or not the distance to be measured indicated by the distance data is included in the appropriate range, and outputs a determination result in association with the apparatus identification information.

An abnormality determination method, according to a second aspect of the present disclosure, for causing a computer to execute the steps of acquiring position data indicating a plurality of positions to be measured of a standard gage used in a coordinate measuring apparatus, in association with apparatus identification information for identifying the coordinate measuring apparatus, generating distance data indicating a distance to be measured that is a distance between the plurality of positions to be measured indicated by the position data, and determining whether or not there is an abnormality in the coordinate measuring apparatus on the basis of whether or not the distance to be measured indicated by the distance data is included in an appropriate range in which the distance to be measured indicated by the distance data is determined to be appropriate and outputting the determination result in association with the apparatus identification information.

An abnormality determination system according to a third aspect of the present disclosure includes a coordinate measuring apparatus, and an abnormality determination apparatus that determines whether or not there is an abnormality in the coordinate measuring apparatus, wherein the coordinate measuring apparatus includes a measuring part that measures (a) a plurality of positions to be measured of a standard gage used in the coordinate measuring apparatus or (b) a distance to be measured that is a distance between the plurality of positions to be measured, and a communication part that transmits position data indicating the plurality of positions to be measured or distance data indicating the distance to be measured to the abnormality determination apparatus in association with apparatus identification information for identifying the coordinate measuring apparatus, the abnormality determination apparatus includes a data acquisition part that acquires the position data or the distance data, a storage that stores an appropriate range in which the distance to be measured is determined to be appropriate, and a determination part that determines whether or not there is an abnormality in the coordinate measuring apparatus on the basis of whether or not the distance to be measured identified on the basis on the position data or the distance data is included in the appropriate range, and outputs the determination result in association with the apparatus identification information.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

First Embodiment

[Outline of Abnormality Determination System S1]

Figure 1:
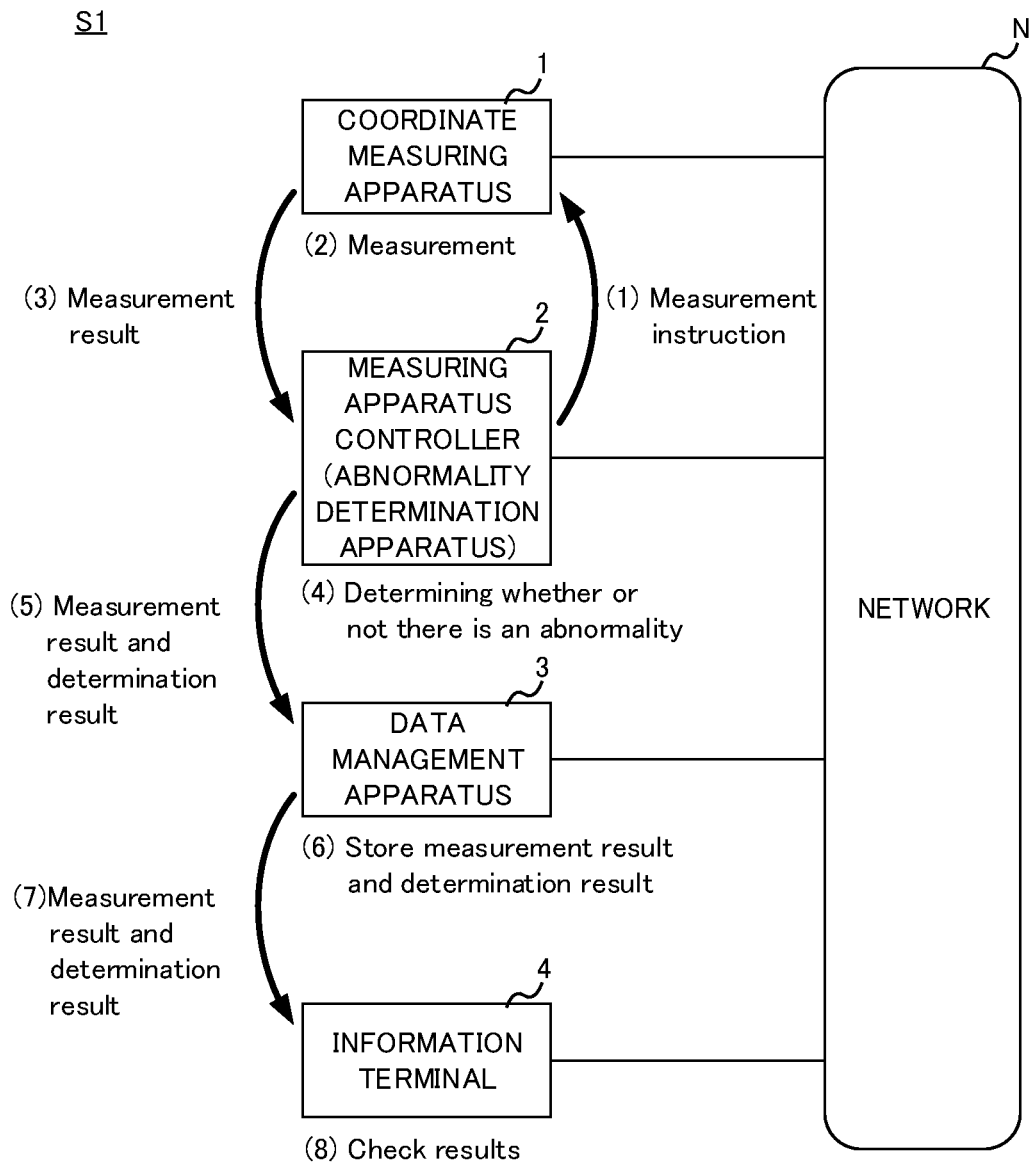
FIG. 1 is a diagram illustrating an overview of an abnormality determination system S1 according to the first embodiment.

FIG. 1 is a diagram illustrating an overview of an abnormality determination system S1 according to the first embodiment. The abnormality determination system S1 includes a coordinate measuring apparatus 1, a measuring apparatus controller 2, a data management apparatus 3, and an information terminal 4. The abnormality determination system S1 is a system for enabling a user of the coordinate measuring apparatus 1 to perform daily inspections to check for an abnormality in the measurement accuracy of the coordinate measuring apparatus 1.

The coordinate measuring apparatus 1, the measuring apparatus controller 2, the data management apparatus 3, and the information terminal 4 are connected via a network N. The network N includes an intranet or the Internet, for example. The coordinate measuring apparatus 1 and the measuring apparatus controller 2 may be connected via a communication line such as a Universal Serial Bus (USB), without passing through the network N.

Figure 2:
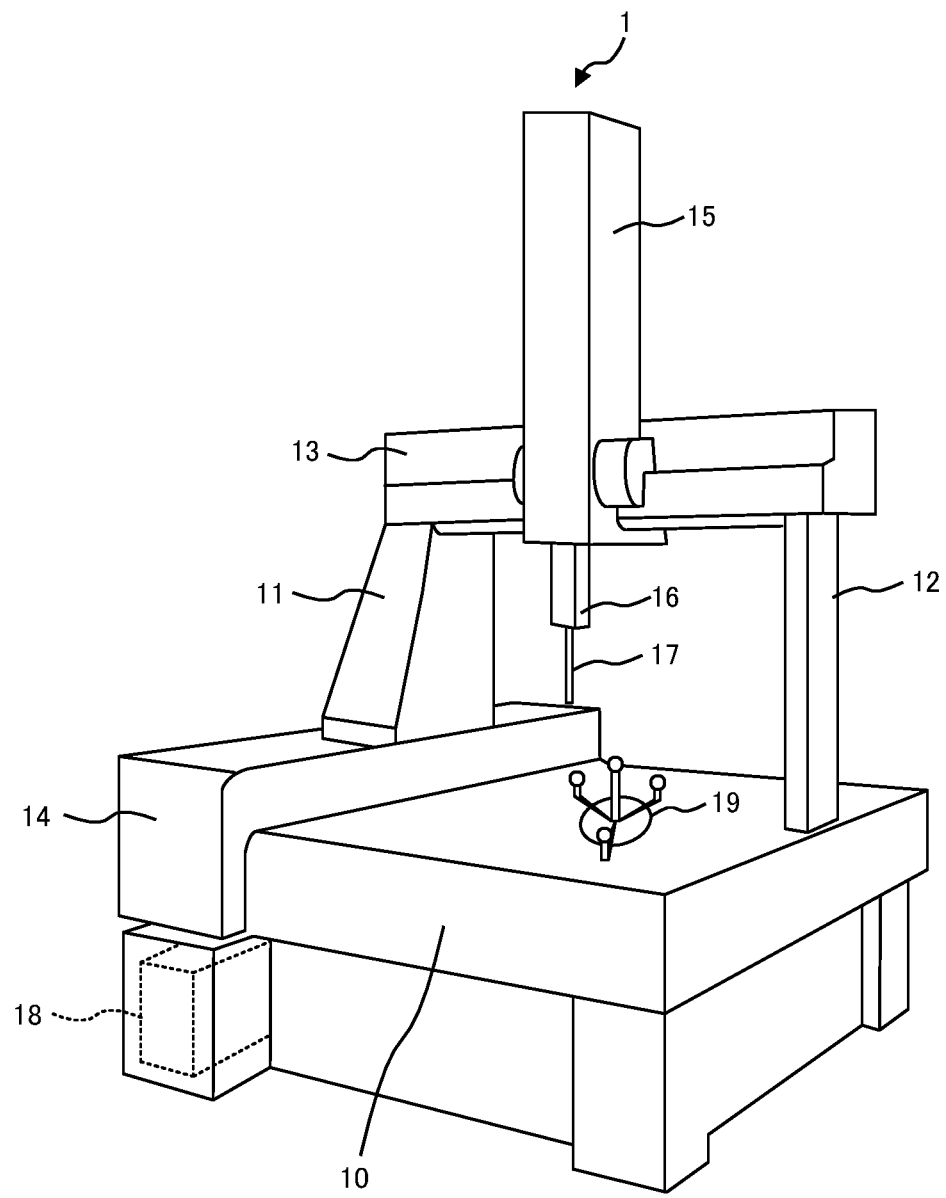
FIG. 2 shows an example of a coordinate measuring apparatus 1.
Figure 2:
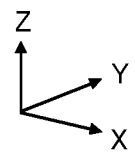

FIG. 2 shows an example of the coordinate measuring apparatus 1. The coordinate measuring apparatus 1 includes a table 10 on which a standard gage 19 is mounted, a column 11, a supporter 12, a beam 13, a Y-axis direction driving part 14, a slider 15, a Z-axis spindle 16, a probe 17, and a control unit 18. The coordinate measuring apparatus 1 measures coordinates of a plurality of positions to be measured of the standard gage 19 by bringing a tip of the probe 17 into contact with the standard gage 19 as the object to be measured while moving the probe 17, for example.

The plurality of positions to be measured are, for example, predetermined positions of a plurality of spheres included in the standard gage 19, such as the center position of the sphere or the farthest position from the center of the standard gage 19 in the spheres. When the center position of the sphere is used as the position to be measured, the position to be measured is measured on the basis of the coordinates of the plurality of positions on a surface of the sphere that has been contacted by the probe 17.

Specifically, the coordinate measuring apparatus 1 moves the probe 17 in an X-axis direction by moving the slider 15 in the X-axis direction along the beam 13. The coordinate measuring apparatus 1 moves the probe 17 in a Y-axis direction by having the Y-axis direction driving part 14 move a gate section including the column 11, the supporter 12, and the beam 13. The coordinate measuring apparatus 1 moves the probe 17 in a Z-axis direction by moving the Z-axis spindle 16 in the Z-axis direction with respect to the slider 15.

The coordinate measuring apparatus 1 measures the coordinates of the plurality of positions to be measured of each of the plurality of spheres included in the standard gage 19 while moving the probe 17 in the X-axis direction, the Y-axis direction, and the Z-axis direction. The coordinate measuring apparatus 1 outputs coordinate information indicating the coordinates of the plurality of positions to be measured, which are measurement results, from a communication part included in the control unit 18 to the measuring apparatus controller 2 via the network N.

Referring back to FIG. 1, the measuring apparatus controller 2 is an information terminal for controlling the coordinate measuring apparatus 1, and is a computer, for example. The measuring apparatus controller 2 operates as an abnormality determination apparatus for determining whether or not there is an abnormality in the coordinate measuring apparatus 1. The measuring apparatus controller 2 determines whether or not a distance between the plurality of positions to be measured, calculated on the basis of the coordinates of the plurality of positions to be measured included in the measurement result acquired from the coordinate measuring apparatus 1, is appropriate. If the calculated distance is determined to be appropriate, the measuring apparatus controller 2 determines that there is no abnormality in the coordinate measuring apparatus 1, and if the calculated distance is determined not to be appropriate, the measuring apparatus controller 2 determines that there is an abnormality in the coordinate measuring apparatus 1.

The data management apparatus 3 is a computer, for example. The data management apparatus 3 may be a single information processing apparatus, or may be formed by a plurality of information processing apparatuses such as a cloud server. The data management apparatus 3 acquires, from the measuring apparatus controller 2, (i) the measurement result indicating the coordinates of the plurality of positions to be measured that have been measured by the coordinate measuring apparatus 1 and (ii) the determination result obtained by the measuring apparatus controller 2 determining whether or not there is an abnormality in the coordinate measuring apparatus 1. The data management apparatus 3 stores the acquired measurement result and determination result in the storage included in the data management apparatus 3.

The information terminal 4 is a computer, for example, and is an information terminal used by a service personnel who performs maintenance of the coordinate measuring apparatus 1 or a user of the coordinate measuring apparatus 1. The information terminal 4 acquires the measurement result and the determination result stored in the data management apparatus 3 via the network N. The information terminal 4 displays the measurement result and the determination result acquired from the data management apparatus 3 on a display connected to the information terminal 4, for example. The operation of the abnormality determination system S1 will be described below.

The coordinate measuring apparatus 1 acquires, via the network N, measurement instruction information outputted by the measuring apparatus controller 2 to instruct the coordinate measuring apparatus 1 to measure the standard gage 19 ((1) in FIG. 1). The measurement instruction information is, for example, information outputted by the measuring apparatus controller 2 during daily inspection of the coordinate measuring apparatus 1, and is outputted by the user operating the measuring apparatus controller 2.

The coordinate measuring apparatus 1 measures the coordinates of the plurality of positions to be measured of the standard gage 19 mounted on the coordinate measuring apparatus 1 when the measurement instruction information from the measuring apparatus controller 2 is acquired ((2) in FIG. 1). The standard gage 19 is placed at a predetermined position in the coordinate measuring apparatus 1 before a user using the coordinate measuring apparatus 1 starts the daily inspection of the coordinate measuring apparatus 1, for example. The coordinate measuring apparatus 1 outputs the measurement result including coordinate information indicating the coordinates of the plurality of positions to be measured to the measuring apparatus controller 2 via the network N ((3) in FIG. 1).

The measuring apparatus controller 2 calculates the distance between the plurality of positions to be measured on the basis of the coordinates of the plurality of positions to be measured included in the acquired measurement result to determine whether or not there is an abnormality in the coordinate measuring apparatus 1 ((4) in FIG. 1). The measuring apparatus controller 2 outputs, to the data management apparatus 3, (a) the determination result indicating whether or not there is an abnormality in the coordinate measuring apparatus 1 and (b) the measurement result acquired from the measuring apparatus controller 2 ((5) in FIG. 1).

The data management apparatus 3 stores the determination result and the measurement result acquired from the measuring apparatus controller 2 ((6) in FIG. 1). The information terminal 4 acquires the determination result and the measurement result stored in the data management apparatus 3 via the network N ((7) in FIG. 1). The service personnel who uses the information terminal 4 checks whether or not there is an abnormality in the coordinate measuring apparatus 1 by displaying the determination result and the measurement result acquired by the information terminal 4 on a display connected to the information terminal 4, for example ((8) in FIG. 1).

By operating the abnormality determination system S1 in this way, the service personnel or the user can acquire the result of the daily inspection of the coordinate measuring apparatus 1. As a result, the service personnel or the user can determine whether or not there is an abnormality in the coordinate measuring apparatus 1 even at a timing different from the timing for service personnel maintenance (for example, annual calibration date), and thus can determine the occurrence of an abnormality in the coordinate measuring apparatus 1 at an early stage.

[Configuration of Abnormality Determination System S1]

Figure 3:
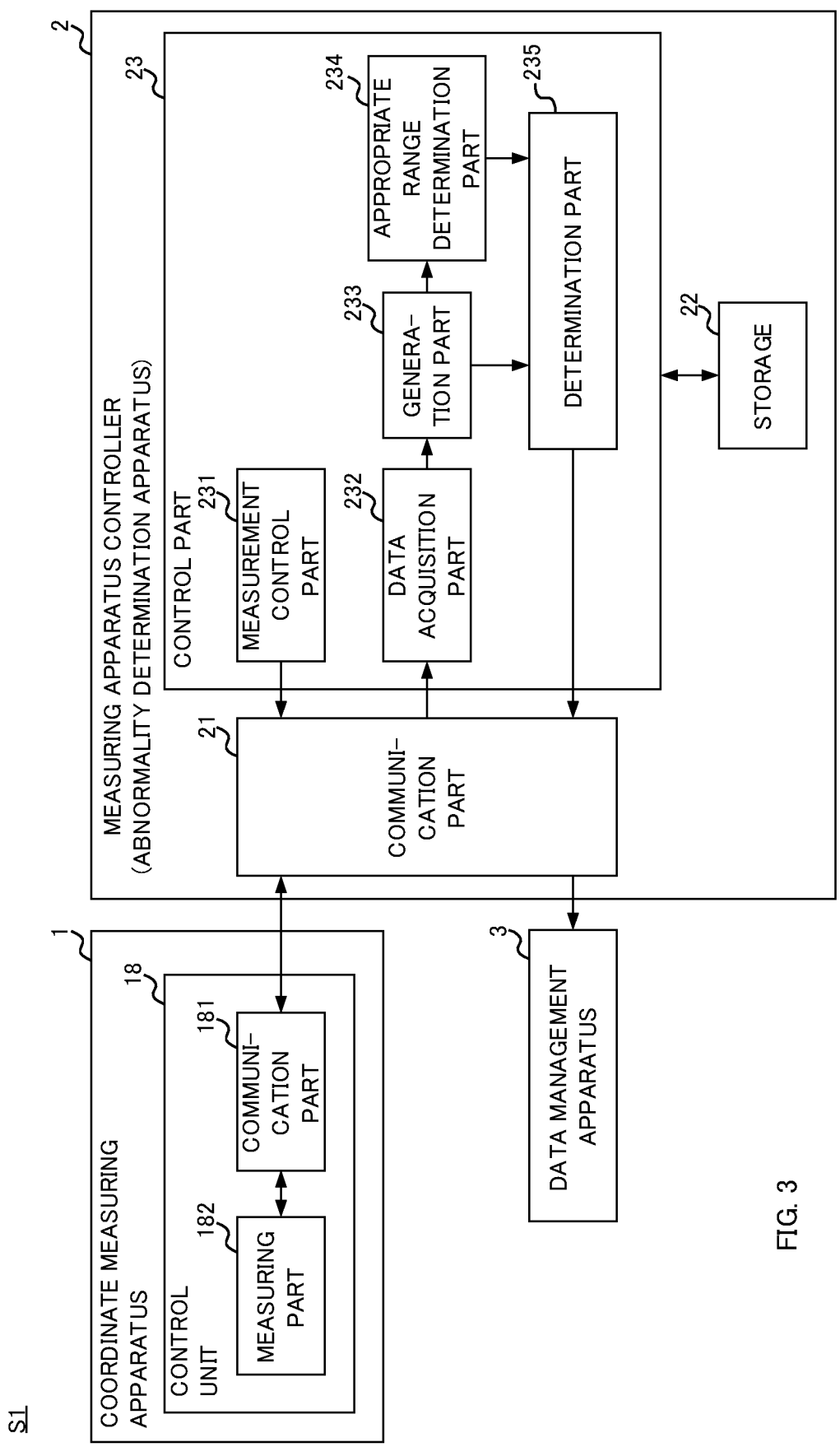
FIG. 3 shows a configuration of the abnormality determination system S1.

FIG. 3 shows a configuration of the abnormality determination system S1. FIG. 3 shows the coordinate measuring apparatus 1, the measuring apparatus controller 2, and the data management apparatus 3. The control unit 18 included in the coordinate measuring apparatus 1 includes a communication part 181 and a measuring part 182. The measuring apparatus controller 2 includes a communication part 21, a storage 22, and a control part 23. The control part 23 includes a measurement control part 231, a data acquisition part 232, a generation part 233, an appropriate range determination part 234, and a determination part 235.

The control unit 18 controls the position of the probe 17 to measure the plurality of positions to be measured of the standard gage 19 when the measurement instruction information from the measuring apparatus controller 2 is acquired. The control unit 18 measures the plurality of positions to be measured by moving the position of the probe 17 to the standard gage 19 on the basis of coordinates indicating a preset position to be measured. The control unit 18 outputs the measurement result obtained by measuring the coordinate measuring apparatus 1 to the measuring apparatus controller 2.

The communication part 181 includes a communication device for transmitting and receiving information via the network N. The communication device is a Local Area Network (LAN) controller or a wireless LAN controller, for example. The communication part 181 notifies the measuring part 182 of the measurement instruction information acquired from the measuring apparatus controller 2. The communication part 181 transmits position data indicating the plurality of positions to be measured to the measuring apparatus controller 2, operating as an abnormality determination apparatus, in association with apparatus identification information (hereinafter referred to as an "apparatus ID") for identifying the coordinate measuring apparatus 1. The position data is the coordinate information indicating the coordinates of the position to be measured, for example.

The measuring part 182 measures the plurality of positions to be measured of the standard gage 19 used in the coordinate measuring apparatus 1. The measuring part 182 measures the standard gage 19 placed on the table 10 if the coordinate measuring apparatus 1 includes the table 10 shown in FIG. 2, and measures the standard gage 19 placed at a predetermined position by the user if the coordinate measuring apparatus 1 does not include the table 10. The measuring part 182 measures the coordinates of the positions to be measured while moving the probe 17 in the X-axis direction, the Y-axis direction, and the Z-axis direction, for example. The measuring part 182 measures the coordinates of the plurality of positions to be measured at each of the plurality of spheres included in the standard gage 19, and generates the position data indicating the plurality of positions to be measured, for example.

[Configuration of Measuring Apparatus Controller 2]

The communication part 21 includes a communication device for transmitting and receiving information via the network N. The communication device is a LAN controller or a wireless LAN controller, for example.

The storage 22 includes a storage medium such as a Read Only Memory (ROM), a Random Access Memory (RAM), and a Solid State Drive (SSD). The storage 22 stores a program executed by the control part 23. The storage 22 stores appropriate range information indicating an appropriate range used for determining whether or not there is an abnormality in the coordinate measuring apparatus 1. The appropriate range information indicates the maximum value and the minimum value of a range in which the distance between the plurality of positions to be measured that have been measured by the coordinate measuring apparatus 1 is determined to be appropriate, for example.

The control part 23 is a Central Processing Unit (CPU), for example. The control part 23 functions as the measurement control part 231, the data acquisition part 232, the generation part 233, the appropriate range determination part 234, and the determination part 235 by executing the program stored in the storage 22.

The measurement control part 231 outputs the measurement instruction information for measuring the plurality of positions to be measured of the standard gage 19 to the coordinate measuring apparatus 1. For example, the user who uses the measuring apparatus controller 2 operates a mouse or a keyboard connected to the measuring apparatus controller 2 to press a "start measurement" button displayed on the display connected to the measuring apparatus controller 2. When the "start measurement" button is pressed, the measurement control part 231 outputs the measurement instruction information to the coordinate measuring apparatus 1.

The data acquisition part 232 acquires a result of the measurement of the standard gage by the coordinate measuring apparatus 1. The data acquisition part 232 acquires the position data indicating the plurality of positions to be measured of the standard gage 19 used in the coordinate measuring apparatus 1 in association with the apparatus ID for identifying the coordinate measuring apparatus 1. The position data is data indicating a result of the measurement of a plurality of predetermined positions to be measured of the standard gage 19 by the coordinate measuring apparatus 1. The position data may include the coordinates of the position to be measured, or may include the coordinates of a plurality of positions on the surface of the sphere used for identifying the center position of the sphere that is the position to be measured. The data acquisition part 232 acquires, from the measuring part 182, the coordinates of the plurality of positions to be measured and the apparatus ID of the coordinate measuring apparatus 1, for example. The data acquisition part 232 may acquire the apparatus ID stored in the storage 22.

The data acquisition part 232 may further acquire temperature data indicating a temperature of the coordinate measuring apparatus 1 at the time when the coordinate measuring apparatus 1 measures the plurality of positions to be measured. For example, at the time when the coordinate measuring apparatus 1 measures the plurality of positions to be measured of the standard gage 19, the data acquisition part 232 acquires the temperature data indicating the temperature acquired by the measuring part 182 from a temperature sensor placed near the standard gage 19, via the network N.

The data acquisition part 232 may further acquire sphericity data indicating the sphericity of the sphere included in the standard gage 19 measured by the coordinate measuring apparatus 1. The data acquisition part 232 acquires the sphericity data generated by the measuring part 182 measuring the sphericity of each of the plurality of spheres included in the standard gage 19 via the network N, for example.

The generation part 233 generates distance data indicating a distance to be measured, which is the distance between the plurality of positions to be measured indicated by the position data. The distance to be measured is, for example, a distance between the centers of two spheres among the plurality of spheres included in the standard gage 19 (hereinafter referred to as a "sphere-to-sphere distance"). The generation part 233 calculates the center positions of the plurality of spheres included in the standard gage 19 on the basis of a plurality of positions on the surfaces of the spheres indicated by the position data to calculate the sphere-to-sphere distance.

The generation part 233 periodically generates the distance data, for example. Specifically, each time the daily inspection is performed, the generation part 233 generates the distance data corresponding to each piece of the position data acquired by the data acquisition part 232. The generation part 233 calculates the distance to be measured, which is the distance between the plurality of positions to be measured indicated by the position data acquired by the data acquisition part 232, to generate the distance data indicating the distance to be measured, for example.

The generation part 233 may generate the distance data indicating the plurality of distances to be measured that are distances between the plurality of positions to be measured indicated by the position data. The generation part 233 generates the distance data indicating two or more distances to be measured, for example, on the basis of the coordinates of three or more positions to be measured indicated by the position data generated by the measuring part 182 obtained by measuring the standard gage 19 having three or more positions to be measured, acquired by the data acquisition part 232.

The generation part 233 may calculate the distance to be measured by correcting, on the basis of the temperature indicated by the temperature data, the distance between the plurality of positions to be measured calculated on the basis of the plurality of positions to be measured indicated by the position data. For example, the generation part 233 corrects the distance to be measured calculated on the basis of the position to be measured indicated by the position data, on the basis of the temperature indicated by the temperature data associated with the position data acquired by the data acquisition part 232. By operating the generation part 233 in this manner, the generation part 233 can calculate the distance to be measured with a reduced measurement error caused by the temperature at the time when the position to be measured is measured.

The generation part 233 may generate initial distance data used to determine an appropriate range of the distance to be measured. For example, when the data acquisition part 232 acquires the position data together with initialization data indicating that the appropriate range is initialized, the generation part 233 generates the initial distance data indicating the distance to be measured at the time of initialization by calculating the distance to be measured that is the distance between the plurality of positions to be measured indicated by the position data. The initialization data is, for example, data generated together with measurement instruction information by the service personnel operating the measuring apparatus controller 2 at the timing when the service personnel performs maintenance of the coordinate measuring apparatus 1.

The appropriate range determination part 234 determines an appropriate range used for determining whether or not the distance to be measured indicated by the distance data is appropriate. The appropriate range is the maximum value and the minimum value of the range in which the distance to be measured is determined to be appropriate. The appropriate range determination part 234 acquires, for example, setting data including the maximum value and the minimum value of the appropriate range from the information terminal used by the user of the coordinate measuring apparatus 1 or the information terminal 4 used by the service personnel. The appropriate range determination part 234 determines the appropriate range on the basis of the maximum value and the minimum value included in the acquired setting data.

The appropriate range determination part 234 may determine the appropriate range based on the initial distance data generated by the generation part 233. The appropriate range is, for example, a range in which the difference between (a) the distance to be measured indicated by the distance data generated by the generation part 233 and (b) the distance to be measured indicated by the initial distance data used as the standard of the appropriate range by the appropriate range determination part 234 is acceptable as an error due to the mechanical accuracy of the coordinate measuring apparatus 1 or an error due to the probe 17.

By having the appropriate range determination part 234 operate in this manner, the appropriate range determination part 234 can determine an appropriate range with high accuracy on the basis of the distance to be measured with little error at the time when the service personnel performs maintenance of the coordinate measuring apparatus 1. As a result, the measuring apparatus controller 2 can determine whether or not there is an abnormality in the coordinate measuring apparatus 1 with high accuracy.

The appropriate range determination part 234 may determine a different appropriate range for each apparatus ID of the coordinate measuring apparatus 1. The appropriate range determination part 234 determines the appropriate range, for example, by identifying the maximum value and the minimum value of the appropriate range associated with the apparatus ID acquired from the coordinate measuring apparatus 1 among the maximum values and the minimum values of the plurality of appropriate ranges included in the setting data. The appropriate range determination part 234 stores the appropriate range associated with the apparatus ID in the storage 22.

The appropriate range determination part 234 may determine a different appropriate range for each model of the coordinate measuring apparatus 1. The appropriate range determination part 234 identifies the model of the coordinate measuring apparatus 1, for example, on the basis of the apparatus ID acquired by the data acquisition part 232 from the coordinate measuring apparatus 1. The appropriate range determination part 234, for example, determines the appropriate range by identifying the maximum value and the minimum value of the appropriate range associated with the identified model, among the maximum values and the minimum values of the plurality of appropriate ranges included in the setting data acquired by the appropriate range determination part 234. The appropriate range determination part 234 stores the appropriate range associated with model information indicating the model of the measuring apparatus, in the storage 22.

By having the appropriate range determination part 234 determine the appropriate range corresponding to the model of the measuring apparatus, the measuring apparatus controller 2 can appropriately determine whether or not there is an abnormality regardless of the model of the coordinate measuring apparatus 1, even if the accuracy required for each model is different.

The appropriate range determination part 234 may determine the appropriate range in association with each of a plurality of measurement areas in the coordinate measuring apparatus 1. The appropriate range determination part 234 acquires measurement area data indicating a measurement area associated with the position data acquired by the data acquisition part 232, for example. The appropriate range determination part 234 determines the appropriate range by identifying the maximum value and the minimum value corresponding to the measurement area indicated by the measurement area data, among the maximum values and the minimum values of the plurality of appropriate ranges included in the setting data. The appropriate range determination part 234 stores the appropriate range in the storage 22 in association with each of the plurality of measurement areas in the coordinate measuring apparatus 1.

By having the appropriate range determination part 234 determine the appropriate range corresponding to the measurement area of the measuring apparatus, the measuring apparatus controller 2 can appropriately determine whether or not there is an abnormality in the coordinate measuring apparatus 1, even if the accuracy of the coordinate measuring apparatus 1 varies in each measurement area and the place where the standard gage 19 is placed is not constant.

The appropriate range determination part 234 may determine the appropriate range associated with each of the plurality of positions to be measured of the standard gage 19. For example, the data acquisition part 232 acquires the position data and sphere identification information (hereinafter referred to as "sphere ID") for identifying the sphere included in the standard gage 19 associated with each of the plurality of positions to be measured indicated by the position data. The appropriate range determination part 234 identifies two sphere IDs associated with two positions to be measured corresponding to the distance to be measured indicated by the distance data generated by the generation part 233.

The appropriate range determination part 234 determines the appropriate range by identifying the maximum value and the minimum value corresponding to the combination of the identified two sphere IDs among the maximum values and the minimum values of the plurality of appropriate ranges included in the setting data. The appropriate range determination part 234 stores the determined appropriate range in the storage 22. By having the appropriate range determination part 234 determine the appropriate range corresponding to the positions to be measured, the measuring apparatus controller 2 can appropriately determine whether or not there is an abnormality in the coordinate measuring apparatus 1 even if the standard gage 19 with different distance between the positions to be measured is used.

The determination part 235 determines whether or not there is an abnormality in the coordinate measuring apparatus 1. The determination part 235 determines whether or not there is an abnormality in the coordinate measuring apparatus 1 on the basis of whether or not the distance to be measured indicated by the distance data is included in the appropriate range, and outputs the determination result in association with the apparatus ID. For example, if the distance to be measured indicated by the distance data generated by the generation part 233 is included in the appropriate range stored in the storage 22, the determination part 235 determines that there is no abnormality in the coordinate measuring apparatus 1. On the other hand, if the distance to be measured is not included in the appropriate range, the determination part 235 determines that there is an abnormality in the coordinate measuring apparatus 1.

The determination part 235 transmits a result of the determination of whether or not there is an abnormality in the coordinate measuring apparatus 1 to the data management apparatus 3 via the communication part 21. The determination part 235 may transmit the determination result together with the distance data indicating the distance to be measured to the data management apparatus 3. The determination part 235 transmits, for example, a vector of the probe 17, the coordinates of the position to be measured, and a diameter and the sphericity of the sphere of the standard gage 19 to the data management apparatus 3.

The distance to be measured is the sphere-to-sphere distance between the plurality of spheres included in the standard gage 19, for example. Since the sphere-to-sphere distance is not easily affected by the directional characteristics of the probe 17, the determination part 235 can determine whether or not there is an abnormality in the coordinate measuring apparatus 1 with high accuracy by using the sphere-to-sphere distance as the distance to be measured.

The determination part 235 may determine whether or not there is an abnormality in the coordinate measuring apparatus 1 on the basis of whether or not the plurality of distances to be measured indicated by the distance data are included in the appropriate range. For example, if one or more distances to be measured among the plurality of distances to be measured are not included in the appropriate range, the determination part 235 determines that there is an abnormality in the coordinate measuring apparatus 1, and if all of the plurality of distances to be measured are included in the appropriate range, the determination part 235 determines that there is no abnormality in the coordinate measuring apparatus 1. By having the determination part 235 use the plurality of distances to be measured in this way, the determination part 235 can improve the accuracy of determining whether or not there is an abnormality.

The determination part 235 may determine whether or not there is an abnormality in the coordinate measuring apparatus 1 by using the appropriate range corresponding to each of the plurality of distances to be measured. The determination part 235 determines whether or not there is an abnormality in the coordinate measuring apparatus 1, for example, on the basis of whether or not the distance to be measured is included in the appropriate range associated with the positions to be measured corresponding to the plurality of distances to be measured indicated by the distance data. The determination part 235, for example, acquires the appropriate range corresponding to two positions to be measured associated with the distance to be measured from the storage 22, and determines whether or not there is an abnormality in the coordinate measuring apparatus 1 on the basis of whether or not said distance to be measured is included in the acquired appropriate range.

By having the determination part 235 determine whether or not there is an abnormality in the coordinate measuring apparatus 1 by using the appropriate range associated with the position to be measured corresponding to the distance to be measured in this manner, the determination part 235 can determine whether or not there is an abnormality in the coordinate measuring apparatus 1 on the basis of the correct appropriate range according to the geometry of the standard gage 19.

The determination part 235 may determine whether or not there is an abnormality in the coordinate measuring apparatus 1 on the basis of the appropriate range associated with the apparatus ID acquired by the data acquisition part 232. The determination part 235 acquires, for example, the appropriate range associated with the apparatus ID from the storage 22, and determines whether or not there is an abnormality in the coordinate measuring apparatus 1 on the basis of whether or not the distance to be measured is included in said appropriate range. By having the determination part 235 operate in this manner, even if the user has a plurality of coordinate measuring apparatuses 1 and the measurement accuracies required vary depending on said plurality of coordinate measuring apparatuses 1, the determination part 235 can determine whether or not there is an abnormality in the coordinate measuring apparatus 1 on the basis of the appropriate range corresponding to the measurement accuracy required for each of the plurality of coordinate measuring apparatuses 1.

The determination part 235 may determine whether or not there is an abnormality in the coordinate measuring apparatus 1 on the basis of the appropriate range associated with the model of the coordinate measuring apparatus 1 identified on the basis of the apparatus ID. The determination part 235, for example, acquires the appropriate range associated with the model of the coordinate measuring apparatus 1 from the storage 22, and determines whether or not there is an abnormality in the coordinate measuring apparatus 1 on the basis of whether or not the distance to be measured is included in said appropriate range. By having the determination part 235 operate in this way, the determination part 235 can determine whether or not there is an abnormality in the coordinate measuring apparatus 1 on the basis of the appropriate range corresponding to the measurement accuracies that vary depending on the models of the coordinate measuring apparatuses 1.

The determination part 235 may determine whether or not there is an abnormality in the coordinate measuring apparatus 1 on the basis of whether or not the distance to be measured indicated by the distance data is included in the appropriate range associated with the measurement area including the plurality of positions to be measured indicated by the position data. The determination part 235 acquires, for example, the appropriate range associated with the measurement area corresponding to the position to be measured from the storage 22, and determines whether or not there is an abnormality in the coordinate measuring apparatus 1 on the basis of whether or not the distance to be measured is included in said appropriate range. By having the determination part 235 operate in this way, the determination part 235 can ensure sufficient determination accuracy even if the user cannot place the standard gage 19 at a fixed position.

The determination part 235 may determine whether or not there is an abnormality in the coordinate measuring apparatus 1 on the basis of the amount of change in the plurality of pieces of distance data that have been generated periodically. The determination part 235, for example, determines whether or not there is an abnormality in the coordinate measuring apparatus 1 on the basis of a result of comparing the amount of change in the plurality of distances to be measured indicated by the plurality of pieces of distance data generated by the generation part 233 to a reference value. The reference value is the maximum value of the amount of change for which it can be determined that there is no abnormality in the coordinate measuring apparatus 1, and is, for example, the maximum value of the range in which the amount of change can be determined to be caused by aging of the coordinate measuring apparatus 1.

The determination part 235, for example, determines that there is no abnormality in the coordinate measuring apparatus 1 if the amount of change in the plurality of distances to be measured indicated by the distance data is smaller than the reference value, and determines that there is an abnormality in the coordinate measuring apparatus 1 if the amount of change in the plurality of distances to be measured is larger than the reference value. By having the determination part 235 operate in this manner, the determination part 235 can determine that there is an abnormality in the coordinate measuring apparatus 1 due to a large change in the distance to be measured even if the distance to be measured is included in the appropriate range, for example. As a result, the determination part 235 can determine whether or not there is an abnormality in the coordinate measuring apparatus 1 with high accuracy.

The determination part 235 may determine whether or not there is an abnormality in the coordinate measuring apparatus 1 on the basis of a result of comparing (a) a pattern of a relationship between a period of time during which three or more distances to be measured have been measured and the three or more distances to be measured to (b) a reference pattern. The reference pattern is a pattern for which it can be determined that there is no abnormality in the coordinate measuring apparatus 1, and may be caused by the aging of the coordinate measuring apparatus 1, for example.

The determination part 235, for example, identifies the amount of change in the three or more distances to be measured and the period of time during which each of the three or more distances to be measured has been measured, to identify the amount of change in two or more distances to be measured corresponding to the amount of change in two or more periods of time. The determination part 235 determines that there is no abnormality in the coordinate measuring apparatus 1 if the identified amount of change is within a predetermined range from the reference pattern of the amount of change acquired from the storage 22, and determines that there is an abnormality in the coordinate measuring apparatus 1 if the identified amount of change is not within the predetermined range. By having the determination part 235 operate in this manner, the determination part 235 can increase the possibility of determining the occurrence of an abnormality in the coordinate measuring apparatus 1 that requires maintenance.

The determination part 235 may determine whether or not there is an abnormality in the coordinate measuring apparatus 1 on the basis of the sphericities of the plurality of spheres included in the standard gage. The determination part 235, for example, determines that there is an abnormality in the coordinate measuring apparatus 1 if the sphericity indicated by the sphericity data acquired by the data acquisition part 232 is out of the predetermined range from the reference value, and the determination part 235 determines that there is no abnormality in the coordinate measuring apparatus 1 if the sphericity is within the predetermined range from the reference value.

If dust or other debris adheres to the sphere included in the standard gage 19, the sphericity of said sphere will vary greatly. To deal with this, by having the determination part 235 determine whether or not there is an abnormality in the coordinate measuring apparatus 1 on the basis of the sphericity indicated by the sphericity data, the determination part 235 can determine whether or not the coordinate measuring apparatus 1 and the standard gage 19 need to be cleaned, for example.

Figure 4A:
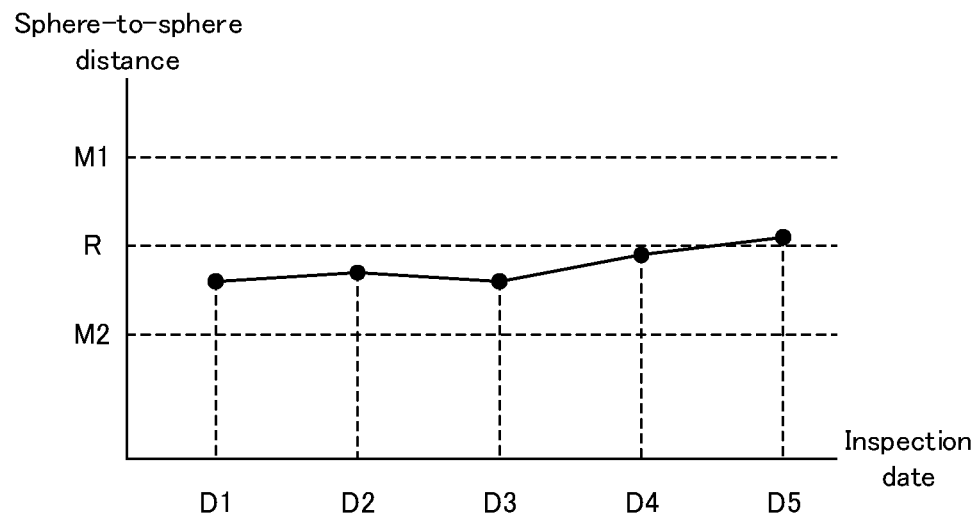
FIGS. 4A to 4B show periods of times during which a plurality of distances to be measured have been measured, along with the plurality of distances to be measured.
Figure 4B:
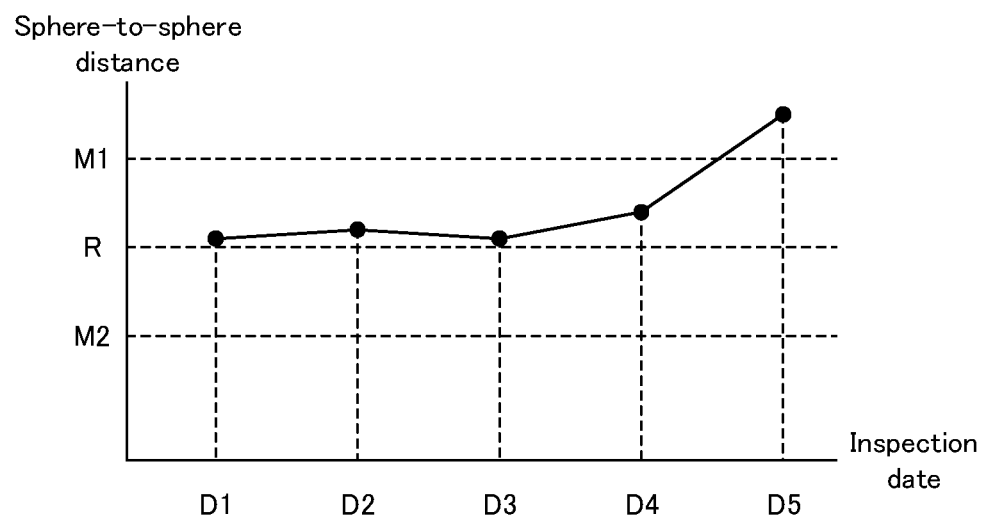

FIGS. 4A to 4B show the periods of times during which the plurality of distances to be measured have been measured, along with the plurality of distances to be measured. The horizontal axes of FIGS. 4A to 4B represent an inspection date at which the distance to be measured is measured, and the vertical axes of FIGS. 4A to 4B represent the sphere-to-sphere distance that is the distance to be measured. A sphere-to-sphere distance R is the sphere-to-sphere distance indicated by the initial distance data that is a reference of the appropriate range. A sphere-to-sphere distance M1 is the maximum value of the appropriate range, and a sphere-to-sphere distance M2 is the minimum value of the appropriate range.

In FIG. 4A, the sphere-to-sphere distance measured on each of a plurality of inspection dates D (D1 to D5) is included in the appropriate range (the sphere-to-sphere distance M1 to the sphere-to-sphere distance M2), and so the determination part 235 determines that there is no abnormality in the coordinate measuring apparatus 1. On the other hand, in FIG. 4B, the sphere-to-sphere distance measured on an inspection date D5 is not included in the appropriate range, and so the determination part 235 determines that there is an abnormality in the coordinate measuring apparatus 1.

The data management apparatus 3 stores the measurement result indicating the distance to be measured and the determination result indicating whether or not there is an abnormality transmitted from the determination part 235 in association with the inspection date, and provides the measurement result and the determination result to the information terminal 4 when required by the information terminal 4. The information terminal 4 displays the measurement result as shown in FIGS. 4A to 4B on a screen, for example. The service personnel who performs maintenance of the coordinate measuring apparatus 1 can see the measurement result shown in FIGS. 4A to 4B by operating the information terminal 4 and acquiring the measurement result and the determination result from the data management apparatus 3.

[Flowchart of Measuring Apparatus Controller 2]

Figure 5:
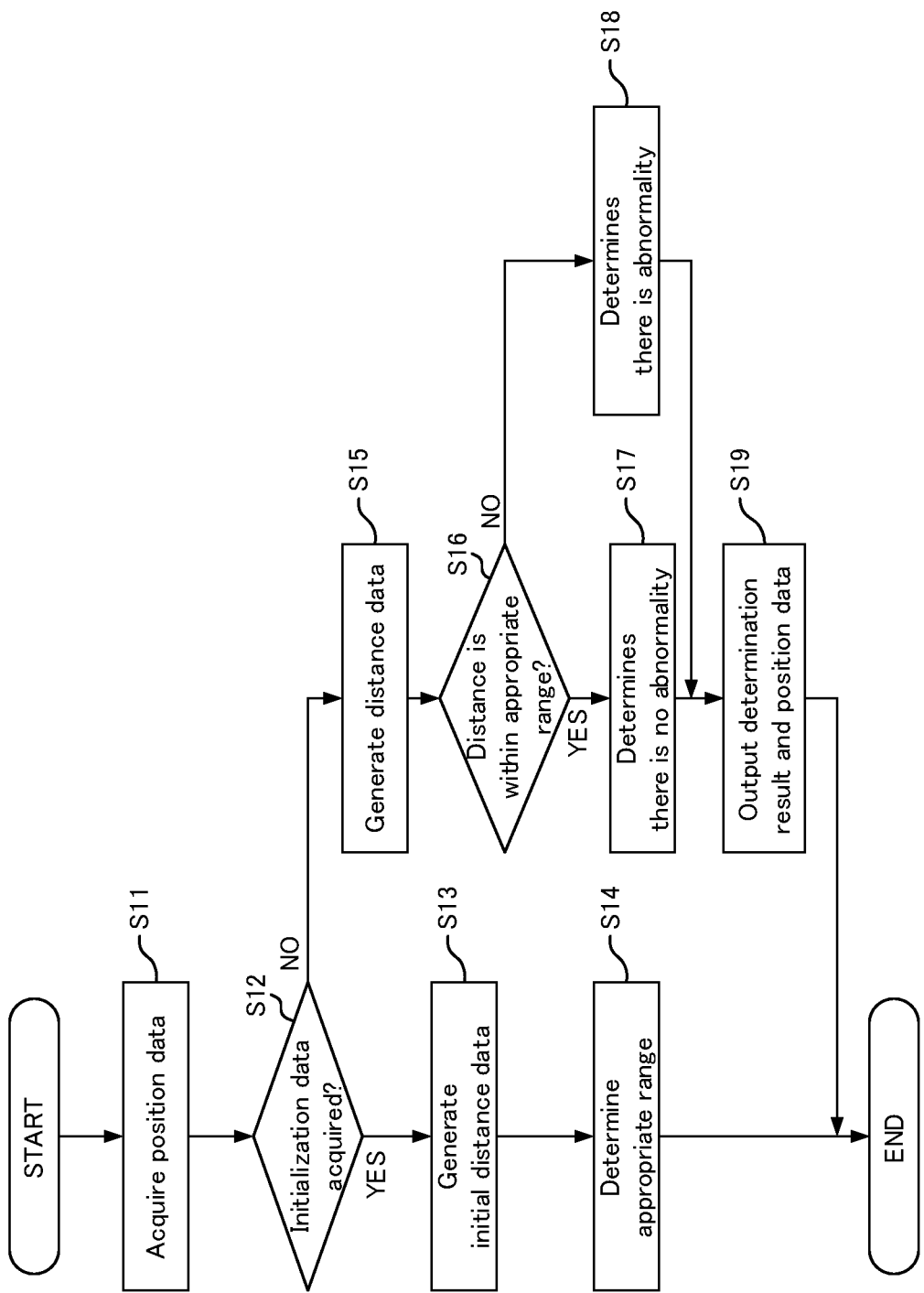
FIG. 5 is a flowchart illustrating an operation of a measuring apparatus controller 2.

FIG. 5 is a flowchart illustrating an operation of the measuring apparatus controller 2. The flowchart shown in FIG. 5 shows the operation from acquiring the position data indicating the measurement result of the standard gage 19 to determining whether or not there is an abnormality in the coordinate measuring apparatus 1.

The data acquisition part 232 acquires the position data indicating a result of the measurement of the plurality of positions to be measured of the standard gage 19 from the coordinate measuring apparatus 1 (step S11). If the initialization data indicating that the appropriate range is initialized is acquired together with the position data (YES in step S12), the generation part 233 calculates the distance to be measured, which is the distance between the plurality of positions to be measured indicated by the position data, to generate the initial distance data (step S13). The appropriate range determination part 234 determines the appropriate range based on the initial distance data generated by the generation part 233 (step S14).

If the initialization data is not acquired together with the position data (NO in step S12), the generation part 233 generates the distance data by calculating the distance to be measured (step S15). If the distance data generated by the generation part 233 is included in the appropriate range (YES in step S16), the determination part 235 determines that there is no abnormality in the coordinate measuring apparatus 1 (step S17). In contrast, if the distance data is not included in the appropriate range (NO in step S16), the determination part 235 determines that there is an abnormality in the coordinate measuring apparatus 1 (step S18). The determination part 235 outputs the determination result indicating whether or not there is an abnormality in the coordinate measuring apparatus 1 and the position data acquired by the data acquisition part 232 to the data management apparatus 3 (step S19).

[Variation]

In the above description, the coordinate measuring apparatus 1 generates the position data, and the generation part 233 generates the distance data indicating the distance to be measured on the basis of the plurality of positions to be measured indicated by the position data, but the coordinate measuring apparatus 1 may generate the position data and the distance data, and output the generated position data and distance data to the measuring apparatus controller 2.

In this case, in the coordinate measuring apparatus 1, the measuring part 182 measures (a) the plurality of positions to be measured of the standard gage 19 used in the coordinate measuring apparatus 1 or (b) the distance to be measured that is the distance between the plurality of positions to be measured. The communication part 181 transmits, in association with the apparatus ID for identifying the coordinate measuring apparatus 1, the position data indicating the plurality of positions to be measured or the distance data indicating the distance to be measured, to the measuring apparatus controller 2 operating as the abnormality determination apparatus.

Subsequently, in the measuring apparatus controller 2, the data acquisition part 331 acquires the position data or the distance data. The determination part 334 determines whether or not there is an abnormality in the coordinate measuring apparatus 1 on the basis of whether or not the distance to be measured identified on the basis of the position data or the distance data acquired by the data acquisition part 331 is included in the appropriate range acquired from the storage 22.

By having the coordinate measuring apparatus 1 generate the distance data in this manner, the measuring apparatus controller 2 can reduce the amount of computation for calculating the distance to be measured from the plurality of positions to be measured indicated by the position data, and thus can reduce the processing load of the measuring apparatus controller 2.

[Effect of Measuring Apparatus Controller 2 According to the First Embodiment]

As described above, the measuring apparatus controller 2 according to the first embodiment includes the data acquisition part 232 that acquires the position data indicating the result of the measurement of the plurality of positions to be measured by the coordinate measuring apparatus 1, and the generation part 233 that generates the distance data by calculating the distance to be measured that is the distance between the positions to be measured. Then, the determination part 235 determines whether or not there is an abnormality in the coordinate measuring apparatus 1 on the basis of whether or not the distance to be measured indicated by the distance data is included in the appropriate range of the distance to be measured stored in the storage 22, and outputs the determination result to the data management apparatus 3. Thus, the user of the coordinate measuring apparatus 1 and the service personnel who performs maintenance of the coordinate measuring apparatus 1 can know the occurrence of an abnormality in the coordinate measuring apparatus 1 at an early stage.

Second Embodiment

[Overview of Abnormality Determination System S2]

Figure 6:
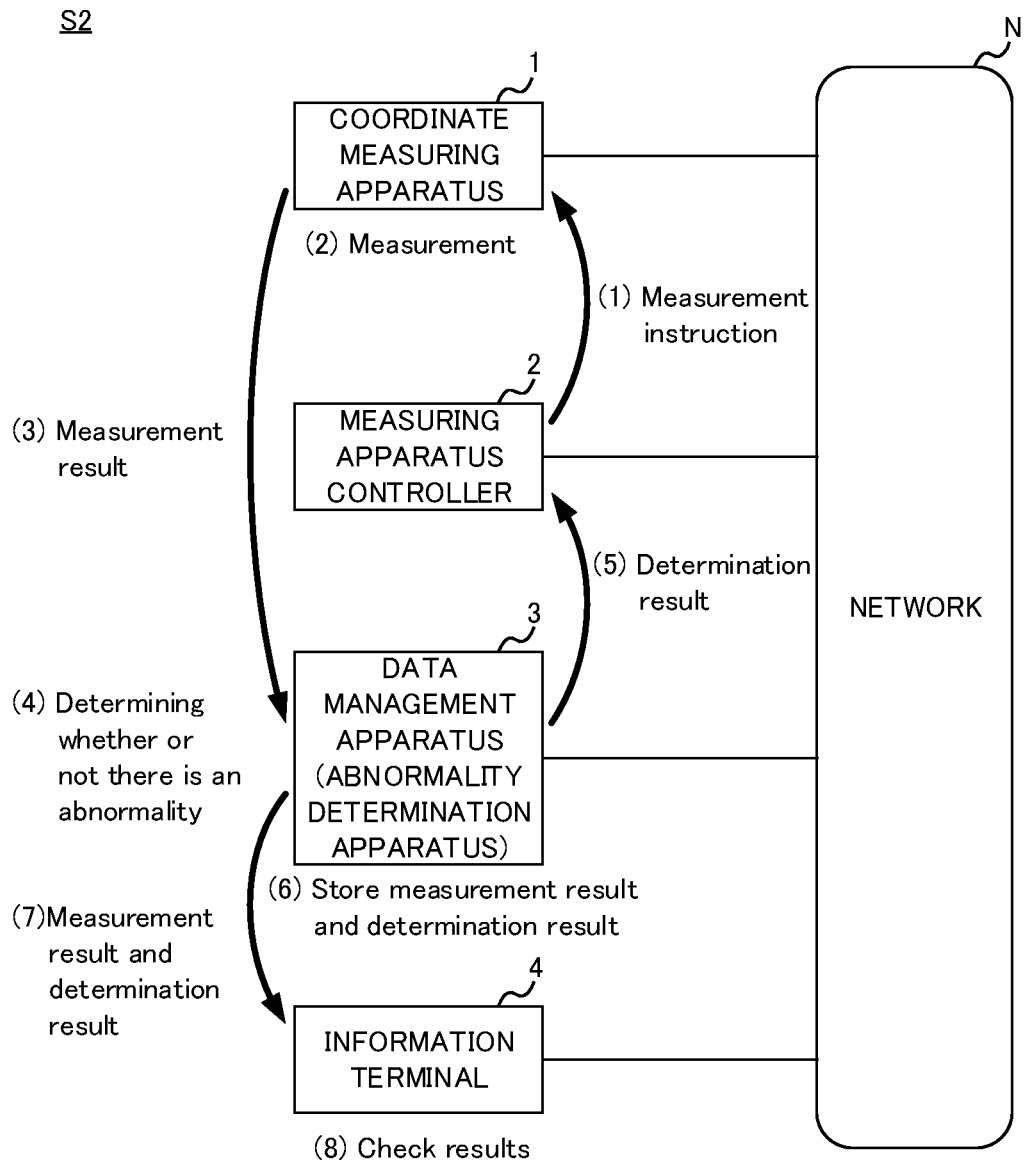
FIG. 6 is a diagram illustrating an overview of an abnormality determination system S2 according to the second embodiment.

FIG. 6 is a diagram illustrating an overview of an abnormality determination system S2 according to the second embodiment. The abnormality determination system S2 differs from the abnormality determination system S1 shown in FIG. 1 in that the data management apparatus 3 operates as the abnormality determination apparatus for determining whether or not there is an abnormality in the coordinate measuring apparatus 1, and is the same in other respects. The operation of the abnormality determination system S2 will be described below.

The coordinate measuring apparatus 1 acquires, via the network N, the measurement instruction information outputted by the measuring apparatus controller 2 to instruct the coordinate measuring apparatus 1 to measure the standard gage 19 ((1) in FIG. 6). The coordinate measuring apparatus 1 measures the coordinates of the plurality of positions to be measured of the standard gage 19 used in the coordinate measuring apparatus 1 when the measurement instruction information from the measuring apparatus controller 2 is acquired ((2) in FIG. 6).

The coordinate measuring apparatus 1 outputs the coordinate information indicating the coordinates of the plurality of positions to be measured as the measurement result to the data management apparatus 3 via the network N ((3) in FIG. 6). The data management apparatus 3 calculates the distance between the plurality of positions to be measured on the basis of the coordinates of the plurality of positions to be measured included in the obtained measurement result to determine whether or not there is an abnormality in the coordinate measuring apparatus 1 ((4) in FIG. 6). The data management apparatus 3 outputs the determination result indicating whether or not there is an abnormality in the coordinate measuring apparatus 1 to the measuring apparatus controller 2 ((5) in FIG. 6).

The data management apparatus 3 stores the determination result obtained by determining whether or not there is an abnormality in the coordinate measuring apparatus 1 and the measurement result obtained from the measuring apparatus controller 2 ((6) in FIG. 6). The information terminal 4 acquires the determination result and the measurement result stored in the data management apparatus 3 via the network N ((7) in FIG. 6). The service personnel who uses the information terminal 4 or the user of the coordinate measuring apparatus 1 checks whether or not there is an abnormality in the coordinate measuring apparatus 1 by, for example, displaying the determination result and the measurement result acquired by the information terminal 4 on the display connected to the information terminal 4 ((8) in FIG. 6).

[Configuration of Abnormality Determination System S2]

Figure 7:
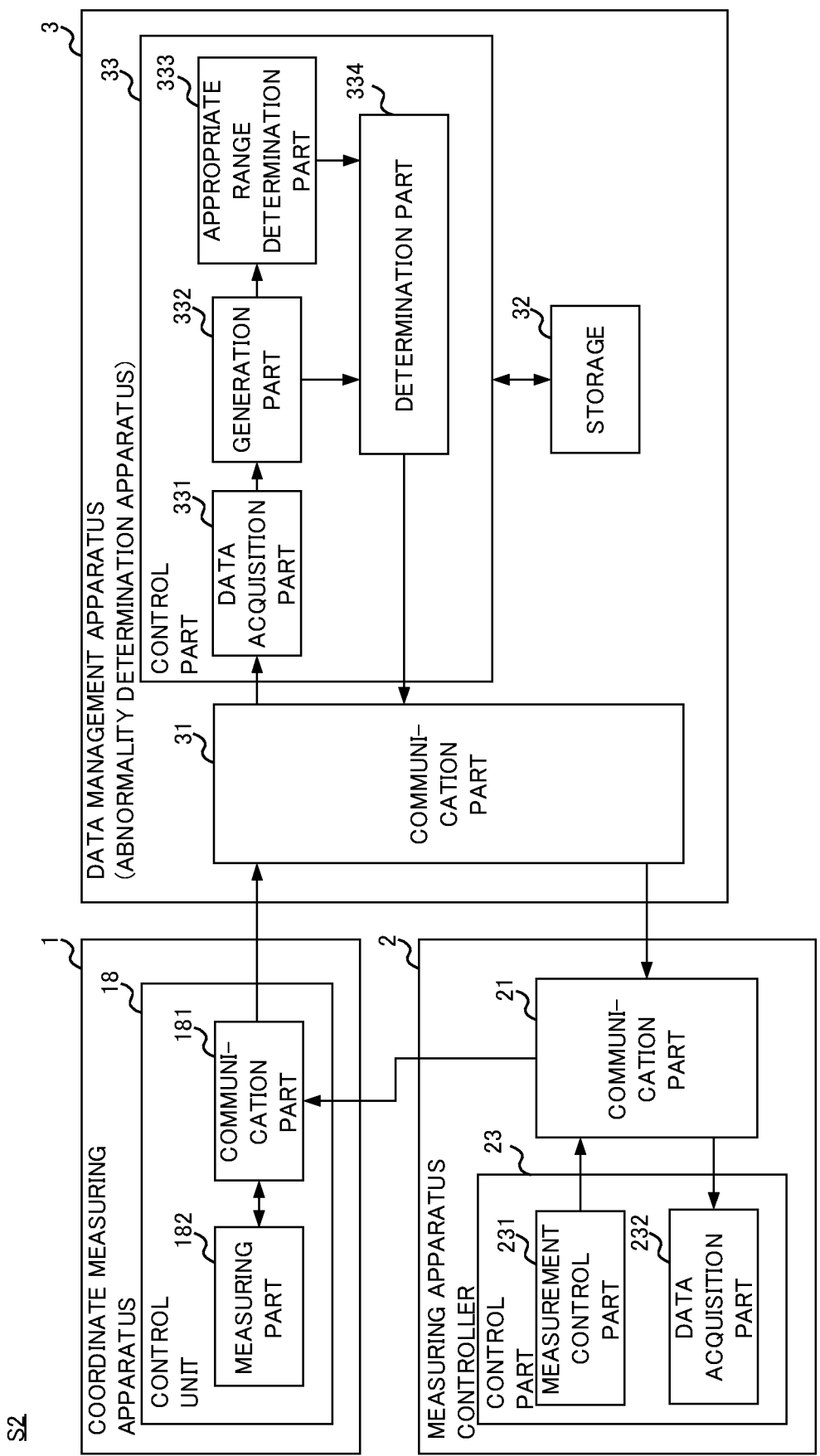
FIG. 7 shows a configuration of the abnormality determination system S2.

FIG. 7 shows a configuration of the abnormality determination system S2. FIG. 7 shows the coordinate measuring apparatus 1, the measuring apparatus controller 2, and the data management apparatus 3. The configuration of the coordinate measuring apparatus 1 is the same as that of the coordinate measuring apparatus 1 shown in FIG. 3. Operations of the measuring apparatus controller 2 and the data management apparatus 3 according to the second embodiment will be described below, focusing on functions different from those of the first embodiment.

The measuring apparatus controller 2 includes the communication part 21 and the control part 23. The control part 23 includes the measurement control part 231 and the data acquisition part 232. The data management apparatus 3 includes the communication part 31, the storage 32, and the control part 33. The control part 33 includes the data acquisition part 331, the generation part 332, the appropriate range determination part 333, and the determination part 334.

The measurement control part 231 is the same as the measurement control part 231 shown in FIG. 3. The data acquisition part 232 acquires, from the data management apparatus 3, the result of determining whether or not there is an abnormality in the coordinate measuring apparatus 1. The data acquisition part 232 displays, for example, the acquired result on the display connected to the measuring apparatus controller 2.

The communication part 31 includes a communication device for transmitting and receiving information via the network N. The communication device is a LAN controller or a wireless LAN controller, for example. The storage 32 includes a storage medium such as a ROM, a RAM, and an SSD. The storage 32 stores a program executed by the control part 33. The storage 32 stores the appropriate range information indicating the appropriate range used for determining whether or not there is an abnormality in the coordinate measuring apparatus 1.

The control part 33 is a CPU, for example. The control part 33 functions as the data acquisition part 331, the generation part 332, the appropriate range determination part 333, and the determination part 334 by executing the program stored in the storage 32.

The data acquisition part 331 has a function equivalent to that of the data acquisition part 232 shown in FIG. 3. The data acquisition part 331 acquires, for example, the vector of the probe 17, the coordinates of the position to be measured, and the diameter and the sphericity of the sphere of the standard gage 19, via the communication part 31. The data acquisition part 331 may acquire these pieces of data from the measuring apparatus controller 2.

The generation part 332 has a function equivalent to that of the generation part 233 shown in FIG. 3. The appropriate range determination part 333 has a function equivalent to that of the appropriate range determination part 234 shown in FIG. 3. Since the data management apparatus 3 can manage data related to the plurality of coordinate measuring apparatuses 1 used by a plurality of users, the appropriate range determination part 333 shown in FIG. 7 may determine the appropriate range in association with a user ID for identifying the user.

The determination part 334 differs from the determination part 235 shown in FIG. 3 in that (a) the determination result indicating whether or not there is an abnormality in the coordinate measuring apparatus 1 is outputted to the measuring apparatus controller 2 in association with the apparatus ID and (b) the measurement result acquired by the data acquisition part 331 and the determination result indicating whether or not there is an abnormality in the coordinate measuring apparatus 1 are stored in the storage 32, and is the same with regard to other points.

[Effect of Data Management Apparatus 3 According to the Second Embodiment]

As described above, the data management apparatus 3 according to the second embodiment includes the data acquisition part 331 that acquires the position data indicating the result of the measurement of the plurality of positions to be measured by the coordinate measuring apparatus 1, and the generation part 332 that generates the distance data by calculating the distance to be measured that is the distance between the positions to be measured. Then, the determination part 334 determines whether or not there is an abnormality in the coordinate measuring apparatus 1 on the basis of whether or not the distance to be measured indicated by the distance data is included in the appropriate range of the distance to be measured stored in the storage 22, and outputs the determination result to the measuring apparatus controller 2.

By having the data management apparatus 3 operate as the abnormality determination apparatus, unlike in the first embodiment, even if a computer used as the measuring apparatus controller 2 is replaced, it is possible to determine whether or not there is an abnormality in the coordinate measuring apparatus 1 without the user re-setting the appropriate range.

The present invention has been described above on the basis of the exemplary embodiments. The technical scope of the present invention is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. An abnormality determination apparatus comprising:
a data acquisition part that acquires position data at three or more different times, indicating a result of a measurement of a plurality of positions to be measured of a surface of at least one sphere of a plurality of spheres included in a standard gage measured by a coordinate measuring apparatus, in association with apparatus identification information for identifying the coordinate measuring apparatus;
a generation part that generates distance data at three or more different times, indicating a distance to be measured that is a distance between centers of two spheres among the plurality of spheres included in the standard gage by calculating center positions of the two spheres based on the plurality of positions to be measured corresponding to each of the two spheres indicated by the position data;
a storage that stores predetermined range information indicating a predetermined range in which the distance data is determined to be within predetermined threshold values, and reference pattern information indicating a reference pattern of an amount of change in the distance to be measured that may be caused by the aging of the coordinate measuring apparatus; and
a determination part that determines whether there is an abnormality in a measurement accuracy of the coordinate measuring apparatus on the basis of whether or not the distance to be measured indicated by the distance data is included in the predetermined range included in the predetermined range information, and outputs a determination result in association with the apparatus identification information, wherein
the determination part identifies the amount of change in the three or more distances to be measured and the period of time during which each of the three or more distances to be measured has been measured, to identify the amount of change in two or more distances to be measured corresponding to the amount of change in two or more periods of time, and determines that there is an abnormality in the coordinate measuring apparatus if the identified amount of change is not within a specified range from the reference pattern even if the distance to be measured is included in the predetermined range.

2. The abnormality determination apparatus according to claim 1, further comprising:
a predetermined range determination part that determines the predetermined range, wherein
when the data acquisition part acquires the position data together with initialization data indicating that the predetermined range is initialized, the generation part generates initial distance data indicating the distance to be measured at the time of initialization by calculating a distance to be measured that is a distance between the plurality of positions to be measured indicated by the position data, and
the predetermined range determination part determines the predetermined range based on the initial distance data.

3. The abnormality determination apparatus according to claim 2, wherein
the data acquisition part acquires the position data and sphere identification information for identifying a sphere included in the standard gage associated with each of the plurality of positions to be measured indicated by the position data, and
the predetermined range determination part determines the predetermined range by (i) identifying two pieces of the sphere identification information associated with two positions to be measured corresponding to the distance to be measured indicated by the distance data generated by the generation part, and (ii) identifying a maximum value and a minimum value of the predetermined range corresponding to the combination of two pieces of the identified sphere identification information.

4. The abnormality determination apparatus according to claim 1, wherein
the data acquisition part further acquires temperature data indicating a temperature of the coordinate measuring apparatus at the time when the coordinate measuring apparatus measures the plurality of positions to be measured, and
the generation part calculates the distance to be measured by correcting the distance between the plurality of positions to be measured calculated on the basis of the plurality of positions to be measured indicated by the position data, on the basis of the temperature indicated by the temperature data.

5. The abnormality determination apparatus according to claim 1, wherein
the storage stores the predetermined range in association with a model of a measuring apparatus, and
the determination part determines whether or not there is an abnormality in the coordinate measuring apparatus on the basis of the predetermined range associated with the model of the coordinate measuring apparatus identified on the basis of the apparatus identification information.

6. The abnormality determination apparatus according to claim 1, wherein
the storage stores the predetermined range in association with the apparatus identification information, and
the determination part determines whether or not there is an abnormality in the coordinate measuring apparatus on the basis of the predetermined range associated with the apparatus identification information acquired by the data acquisition part.

7. The abnormality determination apparatus according to claim 1, wherein
the storage stores the predetermined range associated with each of a plurality of measurement areas in the coordinate measuring apparatus,
the determination part determines whether or not there is an abnormality in the coordinate measuring apparatus on the basis of whether or not the distance to be measured indicated by the distance data is included in the predetermined range associated with the measurement area that includes the plurality of positions to be measured indicated by the position data.

8. The abnormality determination apparatus according to claim 1, wherein
the standard gage includes three or more positions to be measured,
the generation part generates the distance data indicating a plurality of the distances to be measured that are distances between the plurality of positions to be measured indicated by the position data, and
the determination part determines whether or not there is an abnormality in the coordinate measuring apparatus on the basis of whether or not the plurality of distances to be measured indicated by the distance data are included in the predetermined range.

9. The abnormality determination apparatus according to claim 8, wherein
the storage stores the predetermined range associated with each of the plurality of positions to be measured of the standard gage, and
the determination part determines whether or not there is an abnormality in the coordinate measuring apparatus on the basis of whether or not the distance to be measured is included in the predetermined range associated with the plurality of positions to be measured corresponding to the plurality of distances to be measured indicated by the distance data.

10. The abnormality determination apparatus according to claim 1, wherein
the data acquisition part further acquires sphericity data indicating the sphericity of a plurality of spheres included in the standard gage measured by the coordinate measuring apparatus, and
the determination part determines whether or not there is an abnormality in the coordinate measuring apparatus on the basis of the sphericity of the plurality of spheres included in the standard gage.

11. An abnormality determination method for causing a computer to execute the steps of:
acquiring position data indicating a result of a measurement of a plurality of positions to be measured of a surface of at least one sphere of a plurality of spheres included in a standard gage measured by a coordinate measuring apparatus, at three or more different times, in association with apparatus identification information for identifying the coordinate measuring apparatus;
generating distance data indicating a distance to be measured that is a distance between centers of two spheres among the plurality of spheres included in the standard gage by calculating center positions of the two spheres based on the plurality of positions to be measured corresponding to each of the two spheres indicated by the position data, at three or more different times; and
determining whether or not there is an abnormality in a measurement accuracy of the coordinate measuring apparatus on the basis of whether or not the distance to be measured indicated by the distance data is included in a predetermined range in which the distance to be measured indicated by the distance data is determined to be within predetermined threshold values and included by a predetermined range information stored in a storage, and outputting the determination result in association with the apparatus identification information, wherein
during the determining of whether or not there is an abnormality in a measurement accuracy of the coordinate measuring apparatus, identifying the amount of change in the three or more distances to be measured and the period of time during which each of the three or more distances to be measured has been measured, to identify the amount of change in two or more distances to be measured corresponding to the amount of change in two or more periods of time, and determining that there is an abnormality in the coordinate measuring apparatus by the identified amount of change is not within a specified range from the reference pattern even though the distance to be measured is included in the predetermined range.

12. An abnormality determination system comprising:
a coordinate measuring apparatus; and
an abnormality determination apparatus that determines whether or not there is an abnormality in a measurement accuracy of the coordinate measuring apparatus, wherein
the coordinate measuring apparatus includes:
a measuring part that measures (a) a plurality of positions to be measured of a surface of at least one sphere of a plurality of spheres included in a standard gage used in the coordinate measuring apparatus and (b) a distance to be measured that is a distance between centers of two spheres among the plurality of spheres included in the standard gage at three or more different times by calculating center positions of the two spheres based on the plurality of positions to be measured corresponding to each of the two spheres, and
a communication part that transmits distance data indicating the distance to be measured to the abnormality determination apparatus in association with apparatus identification information for identifying the coordinate measuring apparatus at three or more different times,
the abnormality determination apparatus includes:
a data acquisition part that acquires the distance data at three or more different times,
a storage that stores predetermined range information indicating a predetermined range in which the distance to be measured is determined to be within predetermined threshold values and reference pattern information indicating a reference pattern of an amount of change in the distance to be measured that may be caused by the aging of the coordinate measuring apparatus, and
a determination part that determines whether or not there is an abnormality in the measurement accuracy of the coordinate measuring apparatus on the basis of whether or not the distance to be measured identified on the basis of the distance data is included in the predetermined range included in the predetermined range information, and outputs the determination result in association with the apparatus identification information, wherein the determination part identifies the amount of change in the three or more distances to be measured and the period of time during which each of the three or more distances to be measured has been measured, to identify the amount of change in two or more distances to be measured corresponding to the amount of change in two or more periods of time, and determines that there is an abnormality in the coordinate measuring apparatus if the identified amount of change is not within a specified range from the reference pattern even if the distance to be measured is included in the predetermined range.

\* \* \* \* \*